Figure 1:
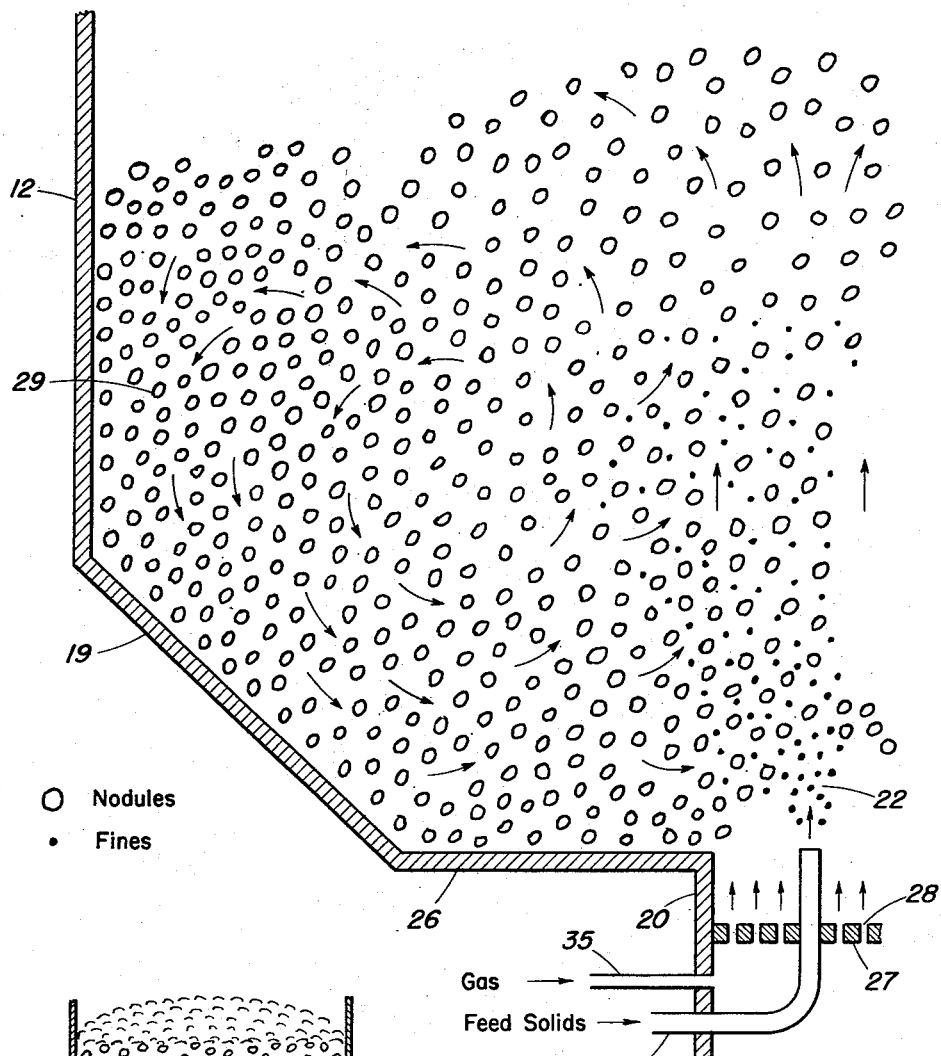

Sept. 28, 1954    L. V. LEE ET AL    2,689,973
METHOD AND APPARATUS FOR CONTACTING SOLIDS WITH GASES
Filed Nov. 28, 1951    2 Sheets-Sheet 1

○ Nodules
• Fines

INVENTORS
Fred Krause
L. Vandergrift Lee
Morton T. Pawel (Deceased)
By Janette B. Pawel, Administratrix BY William J. Fox
ATTORNEY Sept. 28, 1954   L. V. LEE ET AL   2,689,973
METHOD AND APPARATUS FOR CONTACTING SOLIDS WITH GASES
Filed Nov. 28, 1951   2 Sheets-Sheet 2

INVENTORS
Fred Krause
L. Vandergrift Lee
Morton T. Pawel (Deceased)
By Janette B. Pawel, Administratrix
BY William J. Fox
ATTORNEY

Patented Sept. 28, 1954

2,689,973

UNITED STATES PATENT OFFICE 2,689,973

METHOD AND APPARATUS FOR CONTACTING SOLIDS WITH GASES

Lewis Vandergrift Lee, Riverside, Conn., Fred Krause, Lansing, Mich., and Morton T. Pawel, deceased, late of Westport, Conn., by Janette B. Pawel, administratrix, Westport, Conn.

Application November 28, 1951, Serial No. 258,638

2 Claims. (Cl. 18—1)

This invention relates to the accretion of finely-divided solids into nodules or pellets. More particularly, the invention relates to the nodulizing of such solids under solids-fluidizing conditions. An example of this type of nodulization is disclosed in Patent No. 2,465,410 to White. This patent describes the nodulization of ultra-fine solids, such as lime-bearing sludge materials, in the presence of an adhesive, such as soda-ash, that is a promoter of accretion of the fines onto nuclei whereby nodules are formed. Sometimes, the adhesive does not confine itself to promoting very fine solids uniformly and dependably to accrete onto larger ones, but instead promotes building up of solids on the walls of the solids-fluidizing reactor thus allowing some fine solids to escape nodulization.

So an object of this invention is to bring the nodulization or pelletization under better control so that these happenings are avoided with assurance. Yet another object is to minimize stratification of larger nodules in the presence of smaller nodules which are still increasing in size. And a further object is to improve the efficiency of the nodulizing process generally. Yet another object is to improve the manner of providing fuel for heating the fluidized bed whereby fluidization of the solids is not thereby interfered with.

With these objects in view, it is a feature of this invention to supply feed solids to the fluidized bed in such a manner that the fine feed solids are dispersed directly into the uprising streams of fluidizing gas entering the bed. Still another feature is the flowpath pattern attained by the fluidized solids that has an uprising central column that branches out radially and then descends, so that it is substantially mushroom or geyser-shaped.

Yet another feature is the provision of an annular surface surrounding the path of the entering gas streams for deflecting the descending solids back into the central uprising stream of solids in the zone of greatest turbulence.

And yet another feature is the supplying of pumpable fuel for combustion within the bed by means of jets of such fuel projecting directly into the bed of fluidized solids in the zone where the uprising stream of fluidizing gas exhibits a relatively high velocity, namely, in the area of greatest turbulence and least density.

With these and possibly other objects in view, it has been found that they can be attained by the use of an enclosed reactor chamber that has a peripheral wall, a bottom with a hole or eye in it, and a bevelled transitional wall between the peripheral wall and bottom. In the eye of the bottom and somewhat depressed below the bottom is a plate that is gas-permeable such as by being apertured through which pressured gas passes in the form of uprising streams. Entering the reactor is a feed supply conduit adapted for introducing fine feed solids into the high velocity gas stream uprising through the central lower portion of the bed. If the solids are to be heat treated, advantage is to be derived by supplying projected streams of pumpable fuel directly into the zone of greatest turbulence along with feed solids and uprising fluidizing gas.

For nodulizing or pelletizing purposes, the fluidizing in the foregoing manner is carried out in the presence of a solids accretion promoter, of which soda-ash is an example of a class thereof. In general the adhesive substance must be one that melts below the decomposition temperature of the solids undergoing treatment but does not become thermo-setting at such decomposition temperature. The quantity of adhesive present must be sufficient to insure accretion of fines onto nodules but insufficient to cause nodules to adhere to each other.

When calcining and nodulizing lime-bearing sludge solids in the presence of soda-ash as the adhesive, for example, a soda-ash content of ½% to 2% has been found to be optimum.

Summarizing, this invention revolves about the concept of treating finely-divided solids in the presence of an adhesive substance and under solids fluidizing conditions whereby the solids have a positive flow within the fluidized bed from the central bottom portion thereof to an outer upper portion thereof thence returning to the central bottom portion, and maintaining constant conditions of uniform solids fluidization by impeding the downward flow of solids so as to absorb their energy before they are finally returned to the central bottom portion of the bed, and at the same time exerting a stabilizing force against the denser upper portion of the bed thus preventing it from tipping or suddenly plunging onto the constriction plate to cut off the supply of air and cause fluidization to be intermittent or to cease altogether.

Before presenting a detailed discussion of the invention hereof it will be advisable to discuss briefly the nature of the fluidized solids technique as referred to herein.

By the term fluidized is meant the state of dense liquid-like suspension which occurs when an upflowing stream of gas at certain space velocities (which are well-known in the art) is passed through a mass of particle-form solids. A fluidized mass or bed appears quite like a boiling liquid, has its solid particles in rapid, turbulent, zig-zag motion, has a substantially uniform temperature or thermal homogeneity prevailing throughout its breadth and depth, and flows under the influence of a fluistatic head. A fluidized bed may be obtained by establishing and maintaining in an enclosed reactor or furnace a mass of finely-divided solids above a gas-permeable plate or partition through which the suspending or fluidizing gas is forced at a space velocity correlated with the size and density of the coarser solids in the bed. Known fluidizing space velocities for normal fluidizing operations range from as low as 0.2 feet per second to about 20 feet per second which is a range of about a hundredfold.

In certain types of fluidizing operations, namely those where extreme turbulence is required in a certain zone within the reactor, it is necessary to depart from the usual fluidized solids technique as above described. An example of such a process is the case where ultra-fine lime bearing solids in the presence of an adhesive content are treated in a fluidized solids reactor under conditions whereby the solids are both calcined and nodulized, that is to say, the product is calcined lime in the form of spherical pellets. In cases of this nature it has been found that the nodulizing is successful only in areas of extreme turbulence.

It has been found that a specific furnace design is necessary to properly fluidize and nodulize the solids undergoing treatment while at the same time insuring complete combustion of fuel added directly to the bed to furnish heat for the process, because a standard cylindrical furnace with a conventional constriction plate does not give the violent fluidization necessary to keep the pellets from sticking together and de-fluidizing or caking.

It has also been found that a reactor having an ordinary inverted cone-shaped bottom section is unsatisfactory for nodulizing operations. This is so because the fluidizing gas entering through the bottom constriction plate has a relatively high initial space velocity and this high velocity creates a zone of low density immediately above the constriction plate; however, as the gas passes upwardly through the reactor it occupies a greater volume and consequently its velocity is reduced and the suspended solids are less violently agitated; as a result the upper part of the bed is very dense as compared to the low density area directly above the constriction plate. This condition causes complete instability. The resulting fluidized mass then is top-heavy and tends to tip over, that is, to fall towards the side of the reactor thus allowing the solids to plunge suddenly downwardly through the coned bottom section to impinge directly against the constriction plate thus cutting off the supply of fluidizing air and causing momentary defluidization.

We have found that we may avoid these objections by designing a reactor wherein there is set up a positive fluidizing action, where solids feed enters a high velocity zone and there is imparted a violent agitation and up-the-center fluidization at the point where combustion and nodulization take place. That is to say, the nodules go up the center, the velocity of the entraining gas decreasing as it passes dispersingly upwardly through the bed so that solids disperse radially outwardly in the upper portion of the bed and then fall back down all sides of the reactor. The bottom of the reactor is coned to eliminate dead sections and an annular shelf is provided at the bottom of the cone to dampen the effect of the falling nodules on the rapidly rising high velocity gas and pellet stream. The shelf takes up the maximum downward force of the falling nodules and allows them to re-enter the rising stream with a minimum disturbance of the flow pattern.

The annular shelf provided for by this invention has a stabilizing effect in that it dampens the downward plunge of the top-heavy mass thus exerting against the top of such mass a stabilizing force. Since the annular shelf exerts force similarly on all portions of the mass the result is a stabilized mass in which solids or nodules as the case may be, flow more or less uniformly down all sides of the mass to re-enter the central bottom portion of the reactor at a uniform rate thus eliminating the danger of the mass tipping over to cut off the supply of fluidizing gas.

The size or width of the annular bottom or shelf depends upon the size of the reactor, the volume and depth of the bed of solids, the nature of the solids treated, and the treatment given to such solids. It may be generalized, however, that the shelf must be of such size that it will substantially interrupt the downward flow of solids so as to absorb a substantial part of their downward impetus before deflecting them back into the high velocity entrance area. In other words, the shelf must be large enough to prevent the solids from suddenly plunging to the constriction plate.

According to this invention the furnace is so constructed that nodulization and combustion is initiated in a violently agitated fluidized zone in the bottom center of the reactor. This prevents the nodules from sticking together, and provides for good combustion and fluidization. Further the fact that nodulization and combustion take place in the center of the reactor keeps the fine dust and oil away from the furnace walls and decreases scaling. Moreover, the falling column of nodules along the reactor walls tends to rub off any scale formation.

As this invention may be embodied in several forms without departing from the spirit or essential characteristics thereof, the present embodiment is therefore illustrative and not restrictive, since the scope of the invention is defined by the appended claims rather than by the description preceding them, all changes that fall within the metes and bounds of the claims, or equivalents of such metes and bounds, are therefore intended to be embraced by the claims.

Figure 2:
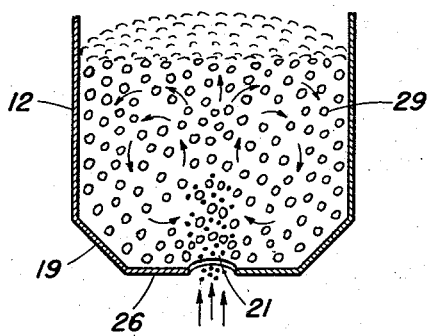
Figure 3:
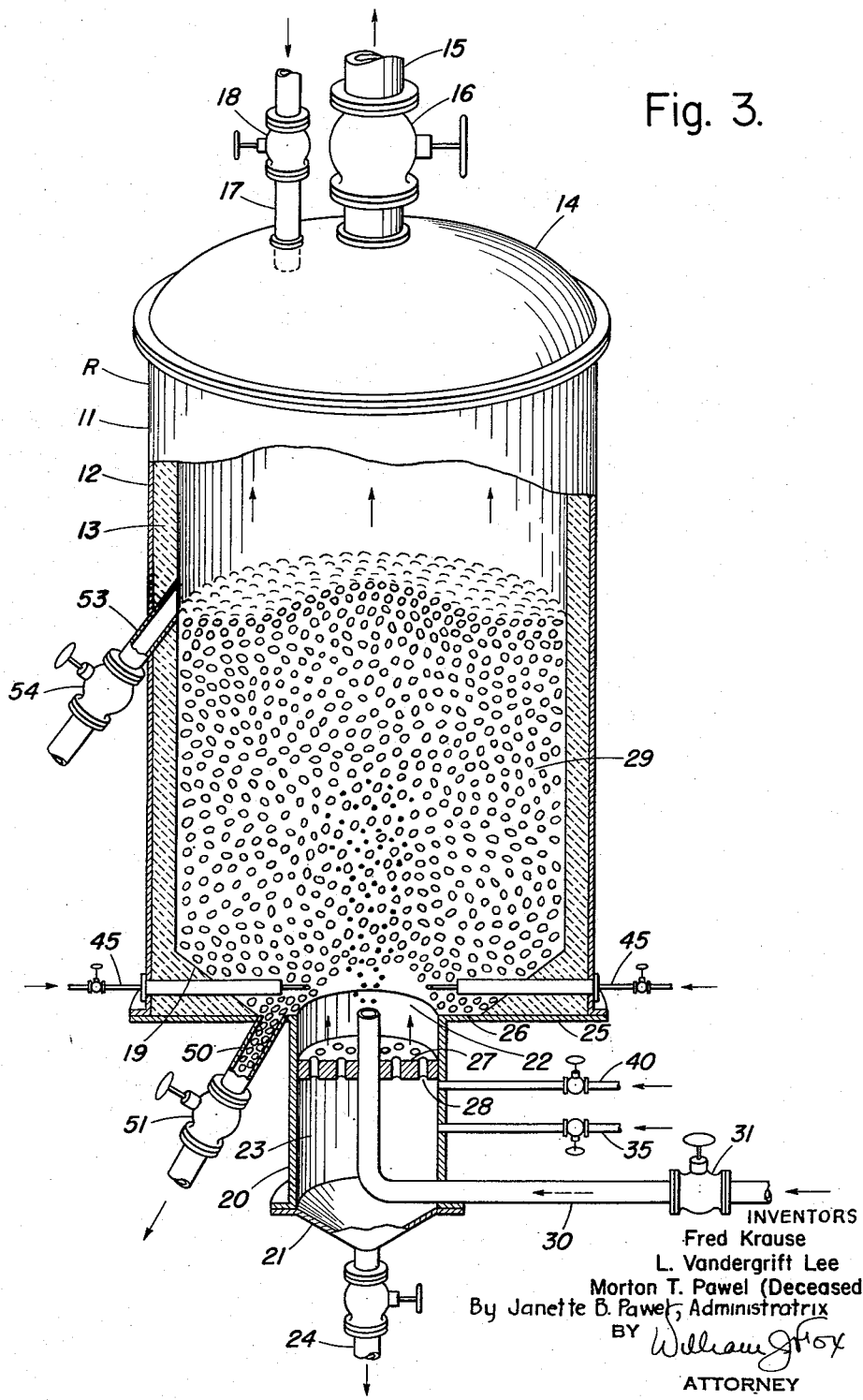

In the drawings, Figure 1 is an idealized cutaway partial view showing the solids flowpath pattern attained in any side of a fluidized bed through the practice of this invention. Figure 2 is similar to Figure 1 except that it depicts an entire fluidized bed so that the solids flowpath pattern may be easily appreciated. Figure 3 shows a preferred embodiment for practicing this invention.

In Figure 1 the reactor wall 12 is connected to the reactor bottom 26, by beveled or sloping section 19. Leading into the reactor bottom is a smaller cylinder 20 which defines entrance area 22. Located in cylinder 20, and depresesd from bottom 26, is constriction plate 27 which is apertured as at 28 to permit the passage of gas. Plate 27 and bottom 26 are adapted to support a fluidized bed of solids 29.

Fine feed solids and adhesive (where used) are introduced into entrance area 22 via conduit 30, fluidizing gas is supplied through conduit 35 to pass upwardly through plate 27.

As shown in the drawings, fine feed to be treated enters a zone of extreme turbulence in and above entrance area 22. In this zone the gas velocity is greatest. The uprising gas disperses and thus suffers a loss in velocity as a result of which the solids are caused to move in the geyser-like flowpath pattern indicated by the arrows.

In the upper outer section of the bed the solids are subjected to less severe fluidization and flow generally downwardly toward the bottom of the bed. The downflowing solids flow onto annular bottom section 26 and are thus deflected uniformly back into entrance area 22. Bottom section 26, in intercepting the downflowing solids, absorbs a large part of their energy thus preventing the solids from impinging directly onto constriction plate 27 to cut off the supply of gas and cause sludging or complete defluidization.

Bottom section 26, which actually is an annular shelf surrounding entrance area 22, serves as a stabilizing support for the denser upper portion of the bed thus preventing the bed from turning completely over to cut off the gas and cause defluidization. That is to say, bottom section 26 causes the bed solids to exert a back pressure more or less uniformly against the dense upper portion of the bed thus holding such dense portion in its proper place and allowing fluidization to proceed unhindered.

In nodulizing operations the positive motion of the solids prevents larger nodules from settling in the center interior portion of the bed to cause defluidization thereof. The nodulized solids flowing downwardly along the reactor wall act as a scrubber to keep such walls swept clean of deposits of adhesive or other solid substances.

Figure 2 is similar to Figure 1 except that it shows an entire bed of solids 29 and the details of constriction plate, feed entrance and fluidizing gas entrance are omitted. Similar parts of Figures 1 and 2 are designated by the same numerals. Figure 2 depicts more clearly the geyser-like solids flowpath pattern attainable by the practice of this invention.

Figure 3 shows a fluidized solids reactor adapted to practice this invention. In Figure 3 the reactor R is made up of a cylindrical shell 11 with a top 14, having gas outlet 15 (valved as at 16) and a solids feed conduit 17 (valved as at 18). The reactor has a metal outer wall 12 and is lined with refractory material 13. The refractory material is so formed at the bottom of cylinder 11 so to provide sloping or beveled side 19. The cylinder has a bottom 25 which is located with respect to beveled side 19 so as to form an annular shelf 26 surrounding the entrance area 22 defined by the entrance of cylinder 20 into bottom 25. Cylinder 20 has a bottom 21 with valved cleanout conduit 24.

Located in cylinder 20 at a region below shelf 26 is a constriction plate 27 having apertures as at 28 to admit gas. The constriction plate and the cylinder define plenum space 23. Feed solids enter the reactor via conduit 30 (valved as at 31) and fluidizing gas enters plenum space 23 via suitably valved conduit 35 and thence passes upwardly into the reactor.

When heat is required to be added to the reactor then initial heating is accomplished by supplying fuel through valved conduit 40 and combusting it in a burner not shown. When fuel combustion temperature has been reached within the reactor, fuel supply 40 is shut off and fuel is thereafter supplied directly into the bed through fuel guns 45 and combusted within the bed.

In supplying fuel directly into the bed for combustion, it is important to inject such fuel into the high velocity entrance area just above the constriction plate so that complete combustion may be attained. This is of extreme importance when the supplied fuel is oil because uncombusted oil will cause caking on the reactor walls and thus result in poor or complete cessation of fluidization.

An initial start-up bed of solids may be introduced to the reactor through conduit 17. In operation feed solids are introduced via conduit 30. Treated solids are discharged via conduit 50 and the rate of discharge regulated by a valve such as that symbolically shown at 51. The fluid level of the bed may be maintained substantially constant by overflow conduit 53 which is valved as at 54.

*Example*

In an actual experimental operation a reactor of the design shown in Figure 3 was used to calcine and nodulize the lime-bearing materials contained in water softening sludge.

A reactor was employed in which the largest inside diameter was 2 feet 6 inches, the diameter of the perforated partition at the bottom of the reactor was 13 inches, the width of the annular shelf surrounding the entrance area was 3 inches, and the bed of solids contained within this reactor was approximately 7 feet in depth with a freeboard space thereabove of approximately 10 feet.

The sludge containing the material to be treated was first dried by conventional means so that as it was ready to enter the reactor it was a dry powdery solid. In the case described the lime bearing material did not contain any adhesive substance so it was necessary to add a sufficient quantity of such substance in order to insure nodulization. Ordinary soda ash was used as an adhesive in a quantity sufficient to make the adhesive content equal to ½% to 2% of the total solids fed to the reactor. This addition was made before the materials were introduced into the reactor. However, it is immaterial where the addition is made so long as it is made at such a point that it has an opportunity to promote the growth of nodules within the fluidized bed.

A bed of calcined nodules or other suitable material is introduced into the reactor before starting up in order to insure operating conditions within the reactor. The reactor was then heated to calcining and nodulizing temperatures (1600°–1800° F.) by the means of first using external heat sources to raise the temperature to fuel combustion temperatures, after which the external heat was removed and the heating continued by supplying fuel directly to the fluidized bed and combusting it there in the presence of oxygen in the upflowing fluidizing gas.

A fine feed admixed with adhesive substance is introduced into the reactor bottom and picked up by the oxygen-bearing fluidizing gas entering the reactor. The oxygen-bearing fluidizing gas is supplied at such a rate that if no solids were present in the reactor the gas would pass through the lower cylindrical section at a linear velocity of approximately 30–40 feet per second. This velocity is referred to as space rate. As the gas passes upwardly through the coned section the volume which it occupies increases and its linear velocity decreases so that when the gas reaches the top of the bed it has a space rate of substantially 3.5 to 5.5 feet per second. As the gas passes upwardly through the bed it fluidizes the solids therein as previously described imparting to them a positive directional motion so that solids in the lower central portion of the bed move upwardly through the bed to the top thereof. In the upper dense portion of the bed the reduced gas velocity allows the still suspended solids to flow downwardly towards the bottom of the reactor thus creating a geyser-like solids flowpath pattern.

The incoming fine feed is carried upwardly through the center of the bed and substantially all of this feed is nodulized during this upward movement through the area of extreme turbulence. Accretion of the fines causing nodule growth occurs generally within the central bottom portion of the bed in the area where the solids are most turbulently agitated. The nodule growth is accomplished by the adherence of fine feed solids to the outer surfaces of already formed nodules or new nodule nuclei. The violent turbulence from the central bottom portion of the bed causes fine solids to impinge on and adhere to the larger solid particles. Thus as the nodules circulate as above described they pick up a new concentric layer of fines each time they pass through the area of violent turbulence. The resulting product is a solid sphere made up of a series of concentric shells surrounding a core. When nodules have become large enough they are removed from the reactor.

Exit gases are alowed to escape through the top of the reactor but are usually circulated through one or more separators in order to remove entrained solids. These separated solids may then be sent to the feed supply or returned directly to the reactor.

Feed solids were supplied at such a rate that approximately 500 pounds per hour of finished product were discharged from the reactor. Fuel consumption for the operation was approximately 56 gallons of oil per ton of product.

During continuous operation the annular shelf exercised a stabilizing effect on the fluidized bed so that no difficulty was encountered in maintaining fluidizing conditions within the reactor.

Whereas we have described a simple operation wherein a single bed of fluidized solids is contained in a fluidized solids reactor, nevertheless this invention will work equally well in any reactor wherein a plurality of such beds is employed such as the case where a reactor contains three superposed beds in which the upper bed is a preheating bed, the intermediate bed a calcining and nodulizing bed, and the lower bed a product cooling and fluidizing gas preheating bed.

We claim:

1. A fluidizing reactor comprising in an enclosed substantially cylindrical casing adapted to contain a bed of fluidized solids and equipped with a top, a wall, a bottom, gas escape means, solids supply means, and solids discharge means; an eye in the center of the bottom thereby defining an annular bottom, an apertured plate in the annular bottom having its upper surface depressed below the upper surface of the annular bottom, means for supplying solids-fluidizing gas through the apertures of the plate for fluidizing solids thereabove, and an inwardly and downwardly inclined annular section between the wall and the annular bottom whereby the annular bottom is contained concentrically within the smallest diameter of said inclined annular section thus constituting an annular horizontal shelf between said inclined section and the eye of said bottom.

2. In the continuous process for nodulizing finely-divided solids under solids fluidizing conditions whereby such solids provided with an adhesive content are introduced into a chamber to establish and maintain therein a single undivided confined mass of such solids that is turbulently mobilized by the upward passage of gas therethrough so that nodules are formed by accretion within the bed and then discharged therefrom; the improvement of maintaining within the undivided mass a lower central zone of relatively low density directly superposed and surrounded by a zone of relatively high density so that the flow-path of fluidized solids within the mass follows a centrally uprising column dispersing radially outwardly thence descending and passing radially inwardly to rejoin the uprising central column whereby nodulization occurs in the portion of low density; which improvement comprises the steps of supplying the uprising gas stream to the bottom of the mass through an entrance area smaller than and concentric with the cross-sectional area of the bottom of the mass, supplying feed solids to the entrance area to be there entrained in the uprising stream of gas supplied to the bottom of the mass, and interrupting the downward flow of descending solids prior to their horizontal re-entry into the uprising central column.

References Cited in the file of this patent

UNITED STATES PATENTS

| Number | Name | Date |
|---|---|---|
| 2,361,346 | Atkins | Oct. 24, 1944 |
| 2,437,694 | Hickman | Mar. 16, 1948 |
| 2,451,391 | Keck | Oct. 12, 1948 |
| 2,465,410 | White | Mar. 29, 1949 |
| 2,487,984 | Rodman | Nov. 15, 1949 |
| 2,503,788 | White | Apr. 11, 1950 |
| 2,550,722 | Rollman | May 1, 1951 |
| 2,561,394 | Marshall | July 24, 1951 |